United States Patent [19]

Wagner

[11] Patent Number: 5,117,868
[45] Date of Patent: Jun. 2, 1992

[54] PILOT-CONTROLLED DIRECTIONAL VALVE

[76] Inventor: Richard Wagner, Dalbergstrasse 3, DE-6500 Mainz-Ebersheim, Fed. Rep. of Germany

[21] Appl. No.: 441,000

[22] Filed: Nov. 22, 1989

[30] Foreign Application Priority Data

Nov. 24, 1988 [EP] European Pat. Off. ........ 88119594.5

[51] Int. Cl.$^5$ ............................................. F15B 13/043
[52] U.S. Cl. .............................. 137/625.64; 137/625.6
[58] Field of Search ...................... 137/625.6, 625.64

[56] References Cited

U.S. PATENT DOCUMENTS

| 2,913,005 | 11/1959 | Grant et al. | 137/625.6 |
| 2,977,984 | 4/1961 | Barnes | 137/625.64 |
| 2,997,064 | 8/1961 | Gerwig et al. | 137/625.64 |
| 3,265,089 | 8/1966 | Nill | 137/625.64 X |
| 4,567,914 | 2/1986 | Coppola et al. | 137/625.64 |

Primary Examiner—Gerald A. Michalsky
Attorney, Agent, or Firm—Gifford, Groh, Sprinkle, Patmore and Anderson

[57] ABSTRACT

Pilot-controlled directional valve having two positions, an admitting position and a closing position for a hydraulic user device, such closing position can be obtained independently from the presence of a supplied hydraulic pressure.

12 Claims, 2 Drawing Sheets

PILOT-CONTROLLED DIRECTIONAL VALVE

BACKGROUND OF THE INVENTION

The invention relates to a pilot-controlled directional valve which is especially suitable for flight control hydraulic systems.

Fluid to such flight control hydraulic systems is provided by pumps and usually there is the possibility to shut off and to admit fluid pressure by a three-way directional valve. The hydraulic system usually is connected to several driven devices such as hydraulic servo drives for aircraft control surfaces and auxiliary functions such as moving a freight door. When the aircraft is to be serviced, the hydraulic system is driven by an electric pump so that aircraft functions can be checked and the freight door can be actuated. Since the service personal may go on the wings of the aircraft during service in the airport, it must be strictly avoided to move control surfaces as long as the aircraft is serviced.

SUMMARY OF INVENTION

It is an object of the invention to provide a pilot-controlled directional valve suitable for flight control hydraulic systems.

A further object is to create a pilot-controlled directional valve which can be moved into a closed position for the outlet port also when there is no hydraulic pressure available.

According to the invention, the directional valve has a pilot stage and a main stage. The main stage comprises a pressure inlet chamber having an inlet port, an pressure outlet chamber having an outlet or service port and a return chamber having a return port. A first valve seat is provided between pressure inlet chamber and pressure outlet chamber, and a second valve seat is provided between pressure outlet chamber and return chamber. A movable main valving element is provided for cooperation with such first and second valve seats and can be moved in a first valve position for shutting off the pressure outlet chamber against the pressure inlet chamber and into a second valve position for communicating the pressure inlet chamber to the pressure outlet chamber. The main valving element comprises a piston means and a valve spring. The piston means is slidably housed within a valve control chamber hydraulically connected to the pilot stage. The pilot stage comprises a pilot pressure inlet port, a control port and a return port as well as a pilot valving element which can be moved electromagnetically between an energized position and an de-energized position. In the de-energized position, the valve control chamber is connected to the pilot pressure inlet port. In the energized position the pilot pressure inlet port is shut off from the valve control chamber and the return port is connected to the valve control chamber so that, independently from the presence of system pressure in the pressure inlet chamber, also when such system pressure is absent, the main valving element is shifted in a position to shut off the outlet or service port against the pressure inlet port.

The pilot pressure inlet port may comprise a restricted connection from the pressure inlet chamber. By these means the main stage of the valve opens somewhat slowly, say during 300 milliseconds so as to increase the pressure in the service system with a rate which is determined by the restrictor such avoiding pressure surges. A further possibility for influencing the working rate of the main stage is to arrange a restrictor in the passage connecting the pilot stage and the valve control chamber. This however has the disadvantage of slowing down also the closing movement (and not only the opening movement) of the main stage. When the hydraulic system is supplied through pumps driven by the aircraft engine, the hydraulic pressure raises from tank pressure slowly to system pressure when the engine is running up. The directional valve of invention may be constructed so as to connect and convey a hydraulic pressure which is below a breakaway pressure necessary for driving a servo control. To that purpose, the valve spring has a bias force which is chosen so that the valving element lifts from the first valve seat and moves to the second valve seat only at a predetermined pressure level which however may be below the breakaway pressure level necessary for initiating movement of the servo control device in question.

The directional valve according to invention shows the following details in design: The piston for actuating the valving element is connected to the pressure inlet chamber on its side opposed to the valve control chamber. The cross-sectional area of the piston means is larger than the cross-sectional area of the main valving element which also is effective as a piston. The valve spring can be arranged in a valve spring chamber which is defined by a stationary wall and the piston means to drive the valving element. The valve spring may also be arranged between a casing member and a poppet or disc member of the valve. The pressure inlet chamber and the service chamber each comprise a port having a large sectional area and the return chamber comprises a port and a connecting duct having a small sectional area. By these features, the size of the valve according to invention can be minimized.

Further features, developments and details of the invention will be described in the following, in the light of the attached drawings.

SHORT DESCRIPTION OF THE DRAWINGS

DETAILED DESCRIPTION OF THE INVENTION

Figure 1:
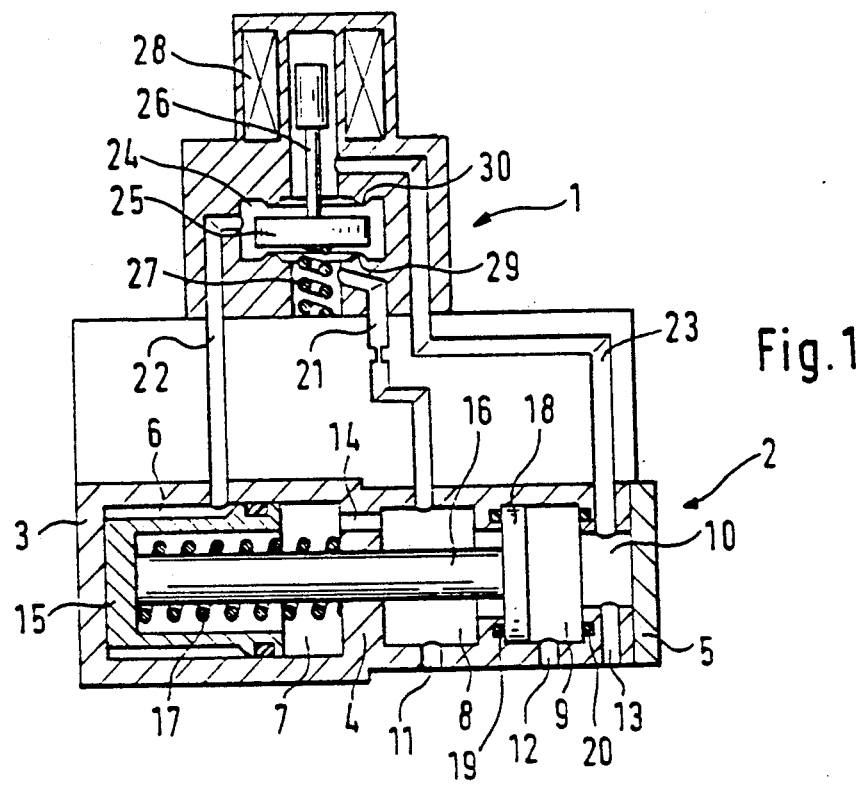
FIG. 1 is a sectional view of the valve according to invention in its first position.
Figure 2:
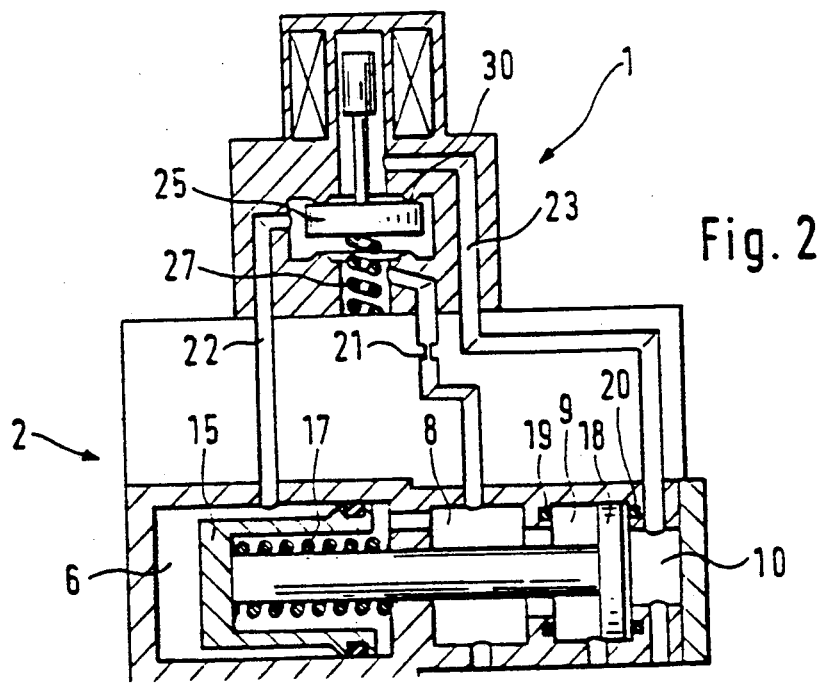
FIG. 2 is a sectional view of the valve in its second position.
Figure 3:
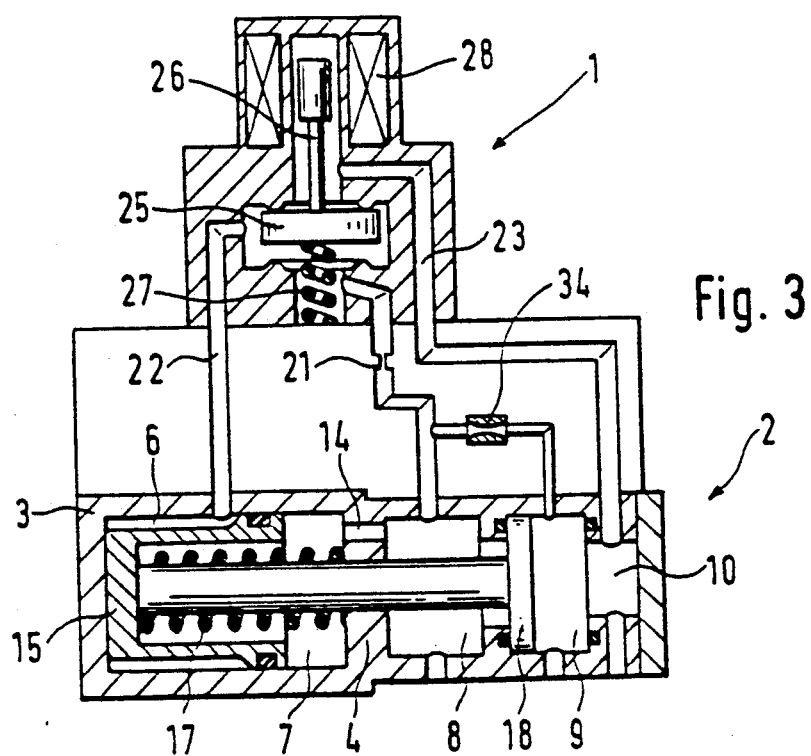
FIG. 3 is a sectional view of the valve in a position without energization and hydraulic pressure.

Referring to FIGS. 1 through 3, the cross-sectional view shown therein is made so as to show the essential passages in one plane. It should be noted however that the construction of the valve may depart therefrom, for example the axis of the pilot stage 1 could be arranged parallel to the axis of the main stage 2.

The main stage 2 comprises a casing 3 shown schematically, the interior thereof being divided by a diaphragm 4 in two halves and being closed by a cover 5. Within the interior, a valve control chamber 6, a spring chamber 7, a pressure inlet chamber 8, a pressure outlet or service chamber 9 and a return chamber 10 are formed. There are three outer ports, namely a pressure inlet port 11, a pressure outlet or service port 12 and a return port 13. The pressure inlet chamber 8 is connected via an internal duct 14 to the spring chamber 7. Chambers 6 and 7 are separated by a piston 15 movable within the cylindrical space formed by chambers 6 and 7. Fixed onto piston 15 is a piston rod 16 surrounded by a valve spring 17 and carrying a poppet or valve disc 18 on its forward end. The poppet or valve disc 18 cooperates with valve seats 19 and 20 formed at radial walls of the service chamber 9 and which may comprise O-rings inserted in respective groves in the casing.

The piston 15, the piston rod 16 and the poppet or valve disc 18 form a movable main valving element which is urged by the valve spring 17 into its first position (FIG. 1) for shutting off the service chamber 9 from pressure inlet chamber 8 and communicating service chamber 9 to return chamber 10. In its second position shown in FIG. 2 the poppet 18 closes off at valve seat 20 so that the return chamber 10 is shut off from the service chamber 9 and free communication is between pressure chamber 8 and service chamber 9. The second position is brought about by hydraulic pressure controlled by the pilot stage 1.

The pilot stage 1 comprises a pilot pressure inlet port 21 formed by a restrictor passage which is connected to the pressure inlet chamber 8. Furthermore, a control passage 22 and a return passage 23 are provided between the pilot stage and the main stage. The control passage 22 may include a restrictor. Passages 21, 22 and 23 lead to a pilot control chamber 24 divided by a poppet or valve disc 25 so that one of the ports 21 or 23 is shut off and the other port being connected to the control passage 22. Movement of poppet 25 is effected through a rod 26 and a spring 27, respectively. Rod 26 comprises an iron core as an armature of a solenoid 28 which, when energized, moves the poppet into the position shown in FIG. 1. Movement of poppet may also be provided by other electromechanic transformer means. When the solenoid 28 is de-energized, the position shown in FIG. 2 will be attained. In the energized position (FIG. 1) poppet 25 seats at pilot valve seat 29 and in the de-energized position (FIG. 2) at pilot valve seat 30. When seating at seat 29, pilot pressure inlet passage is closed, and the control passage 22 is connected to the return passage 23 whereas when poppet 25 seats at seat 30, the return passage 23 is closed off and pilot pressure is communicated through control passage 22 into the valve control chamber 6.

In the embodiment shown, pilot pressure is from inlet chamber 8 and after a transition time of say 300 milliseconds takes the same level as the main pressure (which may be system pressure). Supposing that the cross-sectional area of piston 15 is the same as the cross-sectional area of the poppet 18, the hydraulic forces provided in chambers 7 and 8 balance, whereas the hydraulic forces on the left side of piston 15 and on the right side of poppet 18 as well as the force of spring 17 remain to be considered for any movement. The hydraulic pressure in the return passage is low and compared to the hydraulic pressure in chamber 6 also the force of spring 17 is low so that pilot pressure in chamber 6 determines the position of the valving element formed by members 15, 16, 18 as shown in FIG. 2. The force and rate of spring 17 is adjusted so that movement into the second valve position is only attained when there is a predetermined pressure level in pressure inlet chamber 8, this predetermined pressure level being below a breakaway pressure level necessary for controlling a driven device.

The cross-sectional area of poppet 18 can be chosen according to requirements of the hydraulic flow to the hydraulically driven device. However, the cross-sectional area of poppet 18 should be smaller than the cross-sectional area of piston 15 in order to return the valve in its first position by connecting chamber 6 to return passage via the pilot stage.

Figure 4:
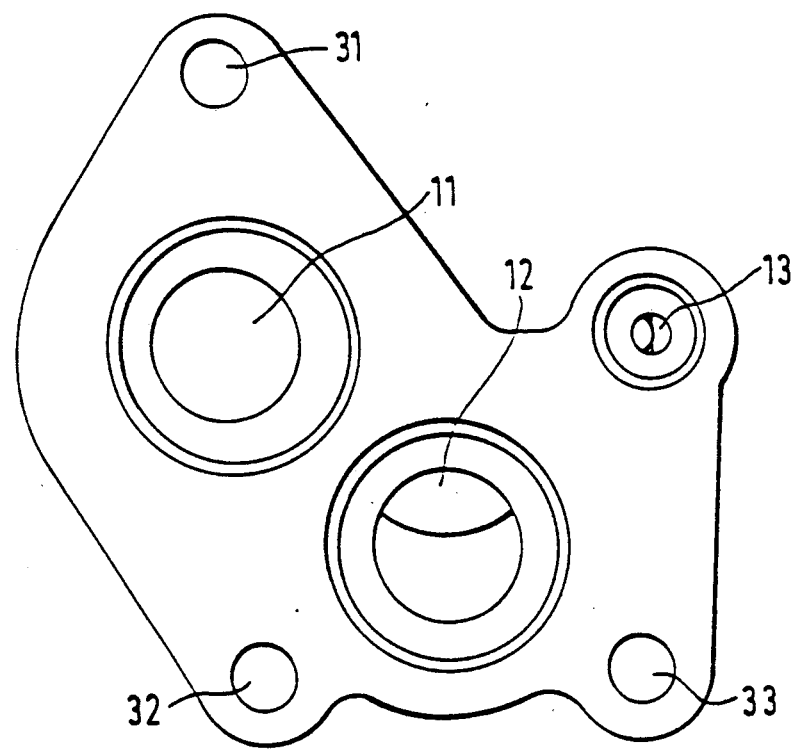
FIG. 4 is a side view onto a connecting flange of a practical valve.

For the purpose intended, larger hydraulic flows are only between pressure inlet and driven consumer. Therefore ports 11 and 12 can be dimensioned accordingly, as can be seen from FIG. 4. For the return port 13 a relative small cross-sectional area is sufficient. Ports 11, 12 and 13 are connected to an adjacent housing through connecting sleeves comprising radial seals. Since hydraulic pressure exists only in ports 11 and 12, openings 31, 32 and 33 are arranged around these pressure ports 11 and 12.

FIG. 3 shows the pressureless and de-energized condition of the valve. Furthermore, a restrictor duct 34 is provided between service chamber 9 and pressure inlet chamber 8 for constituting a bypass in the first position of the valve in order to have the possibility of draining pressure reservoirs which might be present in the hydraulic system. Restrictor duct 34 only drains in the first position of the valve with a leakage flow which can be adjusted by restrictor 34. Restrictor duct 34 is omitted where not necessary.

When the directional valve is connected within a flight control hydraulic system supplied by pumps which are directly driven by the aircraft engine, the pressure created by the pumps initially is low and kept away from service port 12. When a pressure level is attained which is below the breakaway pressure level necessary for driving servo controls or similar in an aircraft, the main valving element is shifted from the position shown in FIG. 3 into that of FIG. 2. Pump pressure increases until system pressure is reached. If system pressure is to be closed off from the hydraulic device to be driven, the electromagnetic transformer means 28 of pilot stage 1 is energized and pressure is taken from valve control chamber 6. Since there is an unimpeached connection between control passage 22 and return passage 23, pressure in the control chamber 6 decreases instantly, and the valve takes its position 1 (FIG. 1) in a very short time delay. The position shown in FIG. 1 also is taken, if freight doors are to be driven whereas simultaneously flight control is to be shut off. Independent from how high hydraulic level is from pressure inlet, the force of spring 17 in connection with lacking pressure in control chamber 6 insures that the valve connects service port 12 to return port 13 so that unintended movements of flight control surfaces at the wings and similar functions are prevented.

What is claimed is:
1. A pilot controlled directional valve for hydraulic fluid comprising a main stage and a pilot stage;
   said main stage comprising a main stage casing including a pressure inlet chamber having a pressure port, a service chamber having a service port, a return chamber having a return port and a valve control chamber;
   a first valve seat being provided between said pressure inlet chamber and said service chamber;
   a second valve seat being provided between said service chamber and said return chamber;
   said main stage comprising a main valving element having piston means and valve spring means for moving said main valving element in opposite directions between said first and second valve seats, said valve spring means moving said main valving element from said second to said first valve seat so as to shut off said service chamber from said pres- sure inlet chamber in its first valve position and said piston means moving said main valving element from said first to said second valve seat to connect said service chamber to said pressure inlet chamber in its second valve position;

said piston means being movable in said valve control chamber which is hydraulically connected to said pilot stage;

said pilot stage comprising a pilot stage casing including a pilot pressure inlet port and a return port, said pilot stage also comprising an electromechanical transformer means and a pilot valving element;

said electromechanical transformer means being adapted to take a de-energized condition and an energized condition for moving said pilot valving element;

said pilot valving element in said de-energized condition of said electromechanical transformer means connecting said pilot pressure inlet port to said valve control chamber so as to move said piston means and said main valving element into said second valve position in contact with said second valve seat to connect said service port to said pressure port;

said pilot valving element in said energized condition of said electromechanic transformer means shutting off said valve control chamber from said pilot pressure inlet port and connecting said return port to said valve control chamber allowing said valve spring means to move said main valving element into said first valve position in contact with said first valve seat to shut off said service port from said pressure inlet port independetly of any system pressure or lack of pressure in said pressure inlet chamber.

2. The directional valve set forth in claim 1 wherein said pilot pressure port includes a restricted passage connected to said pressure inlet chamber.

3. The directional valve set forth in claim 1 further comprising a control passage, including a restrictor.

4. The directional valve set forth in claim 1 wherein said valve spring means has a spring force allowing the main valving element to unseat from said first valve seat only when there is a predetermined pressure level in said pressure inlet chamber.

5. The directional valve set forth in claim 1 wherein said piston means has a first face adjacent to said valve control chamber and a second face hydraulically connected to said pressure inlet chamber.

6. The directional valve set forth in claim 1 wherein said main valving element includes a poppet member having a poppet cross-sectional area and said piston means having a piston cross-sectional area, said piston cross-sectional area being larger than said poppet cross-sectional area.

7. The directional valve set forth in claim 1 wherein said main stage casing includes a valve spring chamber having a stationary wall.

8. The directional valve set forth in claim 7 wherein said valve spring is arranged in said valve spring chamber between said piston means and said stationary wall of said casing.

9. The directional valve set forth in claim 7 wherein said main valving element has a poppet member connected to said valve spring via a piston rod and said main stage casing has a casing cover, said valve spring being arranged within said main stage casing.

10. The directional valve set forth in claim 1 wherein said pressure inlet chamber has a pressure inlet port of relative large cross-sectional area, said service chamber has a service port of relative large cross-sectional area and said return chamber has a return port of relative small cross-sectional area.

11. The directional valve set forth in claim 1 wherein said main valving element is adapted to be moved into said second position when said electromechanic transformer means is in said de-energized condition only when there is some hydraulic pressure in said pressure inlet chamber.

12. The directional valve set forth in claim 1 wherein a restricted passage extends between said service chamber and said pressure inlet chamber.

* * * * *